July 30, 1940. J. LUPO, JR 2,209,412
MACHINE FOR PRODUCING ARTICLES OF MOLDED PLASTIC MATERIAL
Filed July 13, 1935 4 Sheets-Sheet 3

INVENTOR.
JOSEPH LUPO, JR.
BY
Clark & Ott
ATTORNEYS

July 30, 1940.  J. LUPO, JR  2,209,412
MACHINE FOR PRODUCING ARTICLES OF MOLDED PLASTIC MATERIAL
Filed July 13, 1935  4 Sheets-Sheet 4
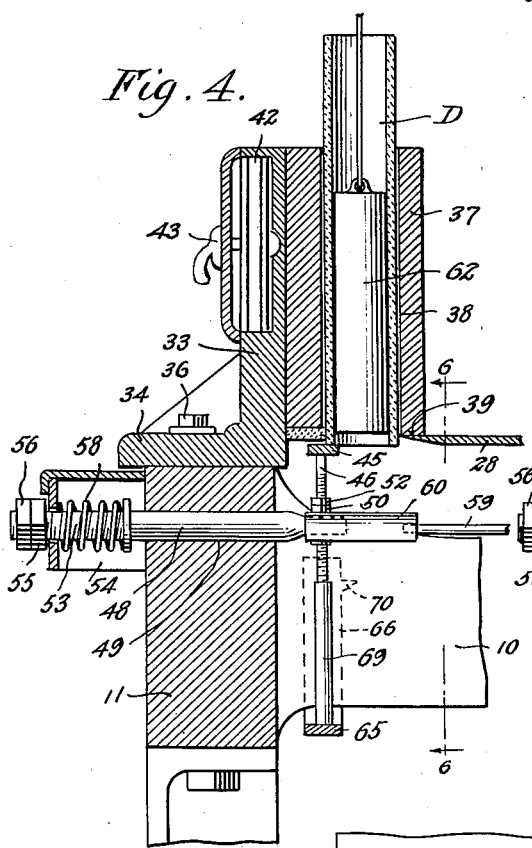
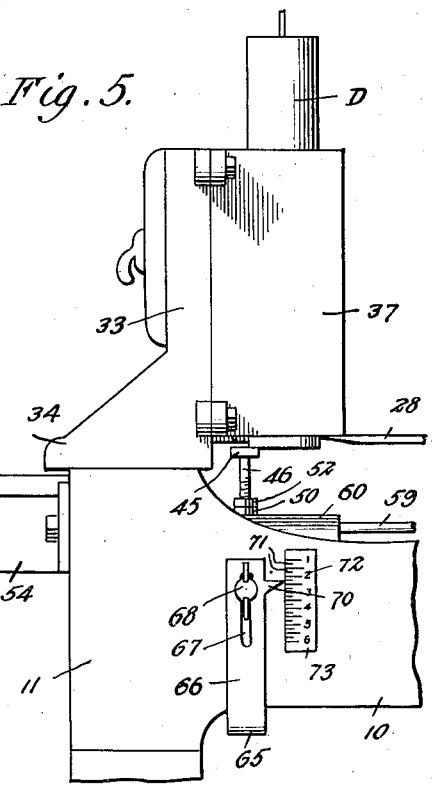
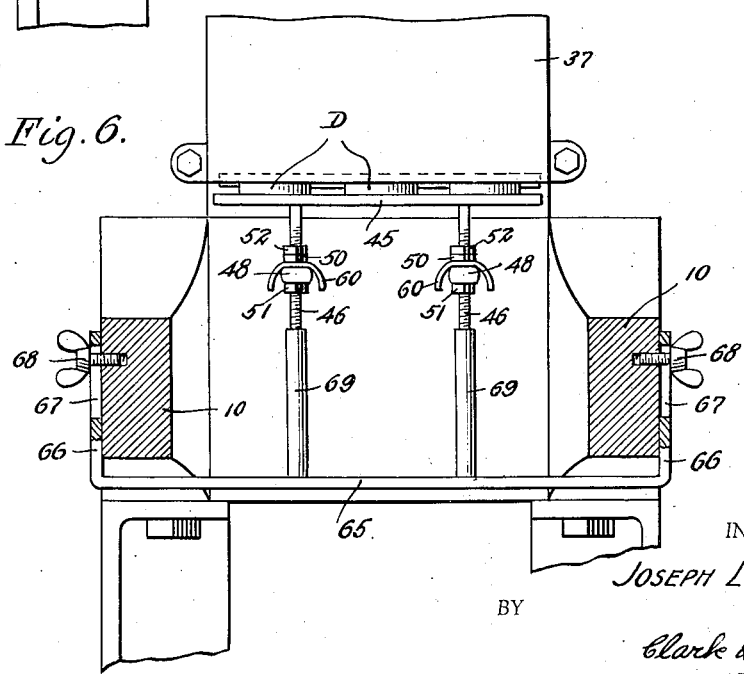
INVENTOR.
JOSEPH LUPO, JR.
BY
Clarke & Ott
ATTORNEYS Patented July 30, 1940

2,209,412

UNITED STATES PATENT OFFICE 2,209,412

MACHINE FOR PRODUCING ARTICLES OF MOLDED PLASTIC MATERIAL

Joseph Lupo, Jr., New York, N. Y.

Application July 13, 1935, Serial No. 31,166

4 Claims. (Cl. 18—1)

This invention relates to machines used in the production of buttons, buckles, bracelets or similar articles made of molded plastic material such as casein, phenol-formaldehyde and nitrocellulose-camphor products and the like.

Heretofore, machines for this purpose have utilized revolving cutting wheels of emery or an equivalent abrasive substance for severing the blanks from the molded lengths of stock, but this practice has been open to certain objections and has possessed disadvantages, notably an enormous amount of waste has resulted therefrom due to the fact that abrasive cutting wheels upon each cut made actually destroy an amount of stock equal to the thickness of the cutting wheel by grinding the same away, while, aside from the fact that the production has been materially limited by the necessity of running the cutting wheel at a comparatively low rate of speed, the cutting wheels have a very limited average length of life due to wear and breakage.

In order to overcome the above noted objections and disadvantages, the present invention provides an improved machine in which the blanks are cleanly cut from the lengths of the molded stock by a slicing action, without any waste, while the rate of speed at which the articles are cut is far in excess of that of any previous machine known for this purpose.

More particularly the invention resides in an improved slicing machine of the character set forth which includes a reciprocatory knife together with a holder having one or more bores corresponding to the cross sectional contour of the molded stock and through which said lengths of stock are fed either gravitationally or otherwise to successively expose from one end of the holder a length of the stock corresponding to the thickness of the articles to be produced, with means against which the stock is successively fed upon each retraction of the knife for gaging the exposed length of stock.

The invention further embodies heating means for maintaining the stock in the holder at a predetermined temperature so that the same is in the required softened condition for slicing without distorting the contour of the stock or the lengths cut therefrom.

As a further feature, the invention provides means cooperating with the stock in the holder, where the same is of hollow or tubular construction, for preventing distortion of the contour of the stock during the slicing operation.

With the above enumerated and other objects in view, reference is now made to the following specification and accompanying drawings in which there is set forth, by way of example, a preferred embodiment of the invention, while the claims cover variations and modifications thereof which fall within the scope of the invention.

In the drawings:

Fig. 4 is a fragmentary sectional view similar to Fig. 3 illustrating the use of supplemental means used in connection with machines for slicing hollow stock and a gage for facilitating the setting of the stock support.

Fig. 5 is a fragmentary side view further illustrating the gage means.

Fig. 6 is a fragmentary transverse sectional view taken approximately on the line 6—6 of Fig. 4.

Figure 1:
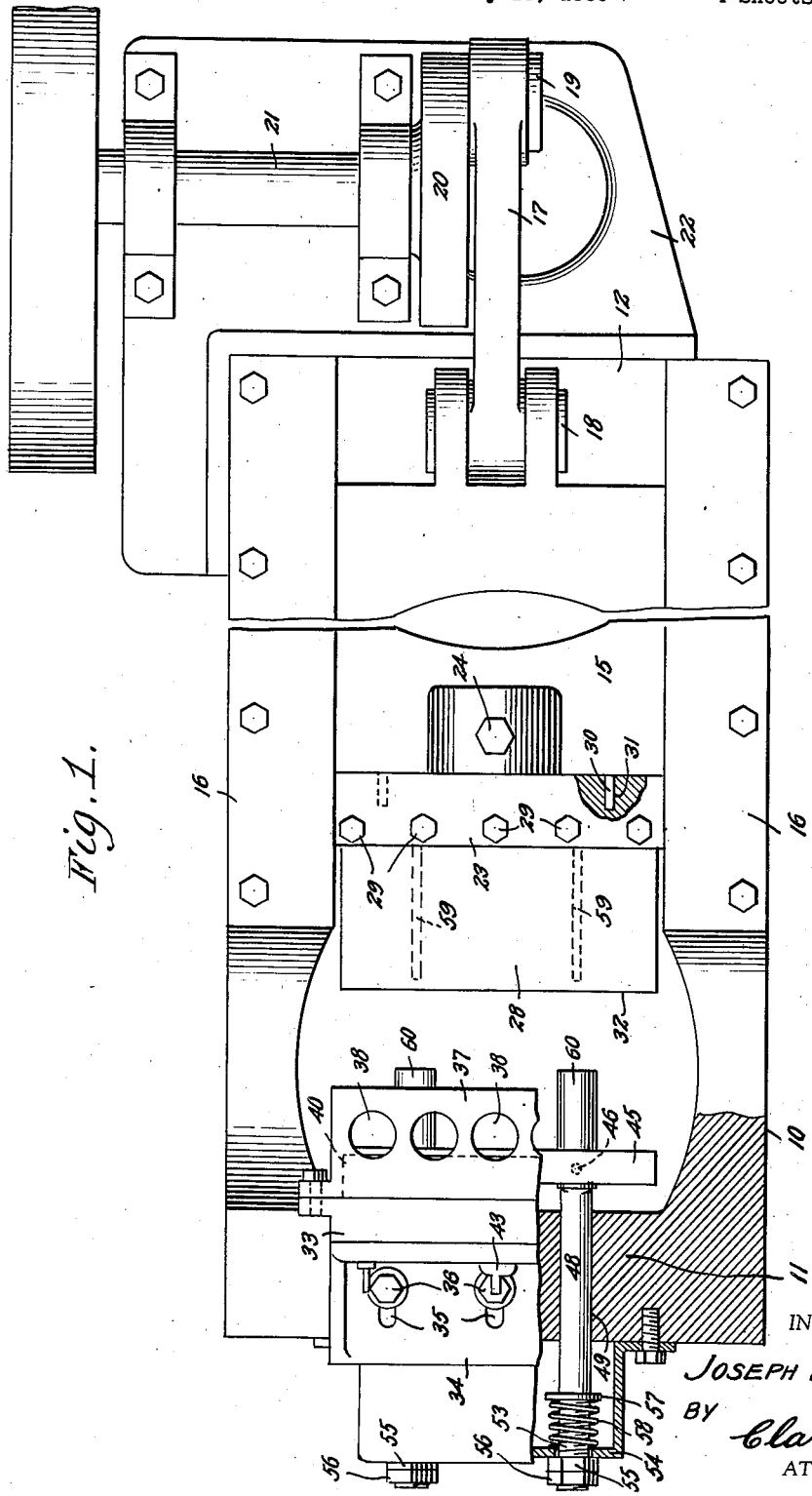
Fig. 1 is a plan view of a slicing machine constructed in accordance with the invention and illustrating the knife in retracted position.
Figure 2:
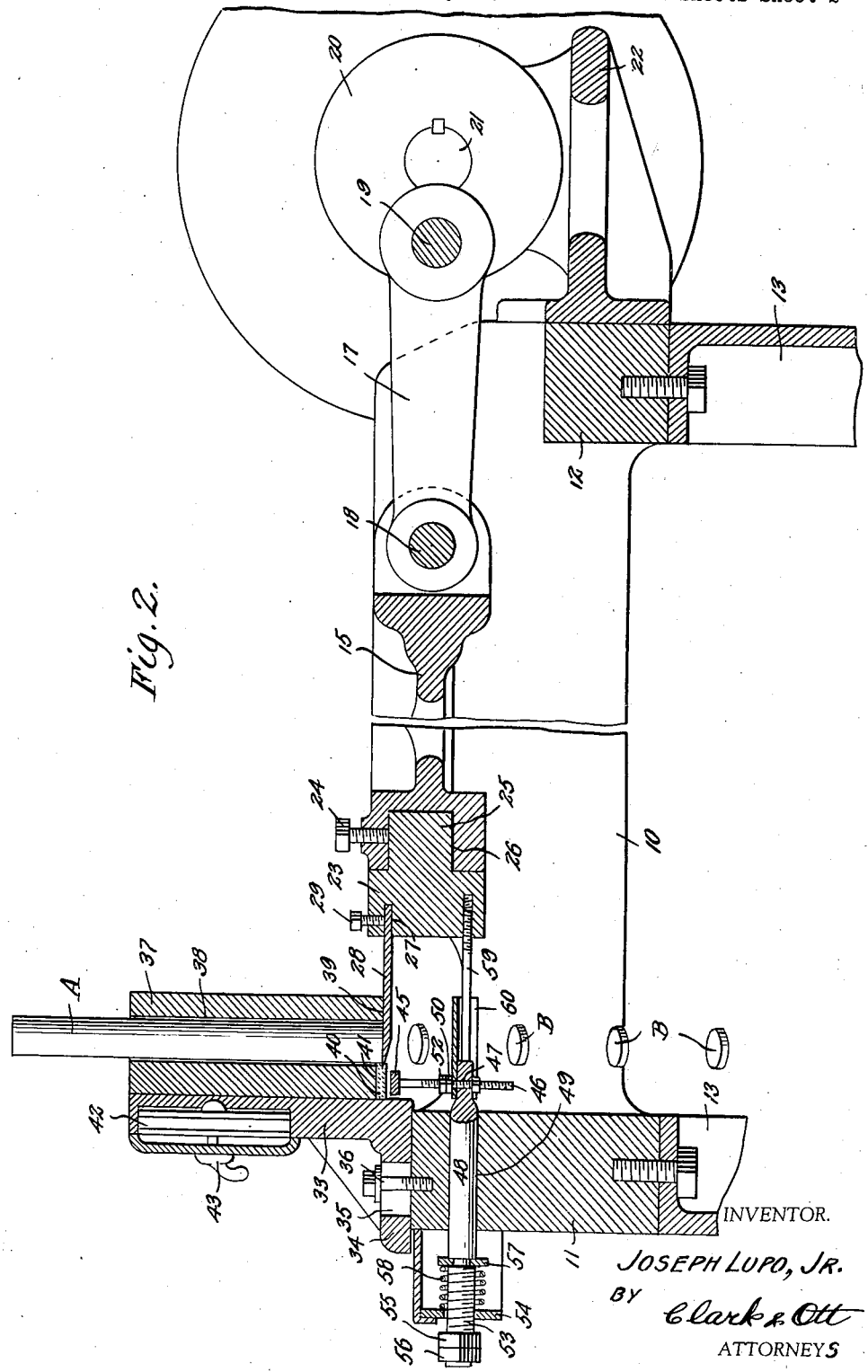
Fig. 2 is a longitudinal sectional view therethrough showing the knife in cutting position.

Referring to the drawings by characters of reference, the machine includes a bed having spaced parallel sides 10 connected by front and rear ends 11 and 12, the bed being supported by depending legs 13 at the corners thereof. The inner surfaces of the sides 10 are rabbeted to provide horizontal supporting ledges 14 to guidedly support a reciprocatory slide member 15 retained in the bed by retaining strips 16. The slide member 15 is reciprocated by any suitable means but as shown, said means consists of a connecting rod 17 which is fulcrumed at one end as at 18 to the slide member and fulcrumed at its opposite end on the eccentric pin 19 of a rotary eccentric wheel 20 which is keyed to a driven shaft 21 journaled in a bearing bracket 22 secured to the rear end 12 of the bed.

A knife holder 23 is carried by the forward end of the slide member and is detachably associated therewith by means of a screw 24 which engages with a rearwardly extending stud 25 positioned in a socket 26 at the forward end of the slide member. The knife holder is formed with a transverse groove 27 opening through its forward face and located adjacent the upper portion thereof, within which groove the rear edge of the knife blade 28 is positioned and retained in place by a plurality of screws 29. The knife holder and knife blade are set and retained in a horizontal position by means of pins 30 located on opposite sides of the socket 26 and protruding from the forward end of the slide member 15 for engagement in sockets 31 formed in the knife holder.

The knife blade 28 is provided with downwardly and rearwardly beveled forward cutting edge 32 and reciprocates with the knife holder 23 and slide member 15 in horizontal plane in the form of the invention illustrated, the stroke of the blade being limited by the diameter of the path of movement of the eccentric pin 19.

The forward end 11 of the bed has mounted on the upper surface thereof, for fore-and-aft adjustment, an upstanding stock holder support 33 provided with a horizontal base flange 34 which is slotted as at 35 to receive the anchoring screws 36. The stock holder support has detachably secured to its rear surface, in flat contact therewith, a stock holder 37 provided with one or more vertical bores 38 of a cross sectional configuration corresponding to the cross sectional contour of a length of molded plastic material A which is to be successively cut to provide the blanks B from which the articles are to be produced. The bores 38 are of a relatively sufficiently greater cross sectional size than the molded lengths of stock A, to permit the same to freely gravitate through the bores and the lower surface 39 of the stock holder 37 is in substantially the same horizontal plane as the upper surface of the knife blade 28, a slight clearance therebetween being allowed for the reciprocation of the knife blade thereunder and across the bores 38.

A cutting strip 40 of fiber or an equivalent material is detachably secured by means of screws or the like in a recess 41 in the underside of the stock holder at the forward portion thereof, the rear edge of the cutting strip extending slightly beyond the forward portion of the peripheries of the bores 38 and the lower surface of the cutting strip being disposed slightly below the forward cutting edge of the knife to insure a clean cutting or slicing of the stock A.

By virtue of the detachable connection of the cutting strip with the stock holder, the same may be inverted and reversed to present four useful surfaces in order to increase the length of usefulness of the strip.

In practice, to obtain a clean cutting or slicing action, the stock is softened to a predetermined degree by heating the same preferably through immersion in hot water and in order to maintain the stock at the desired temperature and degree of softness, the stock holder is heated and maintained at a predetermined temperature preferably by means of an electric resistance heating unit 42 which is located in the stock holder support 33 and the temperature of which is controlled by a heat regulator 43 of any well-known type, such as are used in electric pressing irons, it being understood that the heat is conveyed by conduction through the stock holder support to the stock holder 37.

Figure 3:
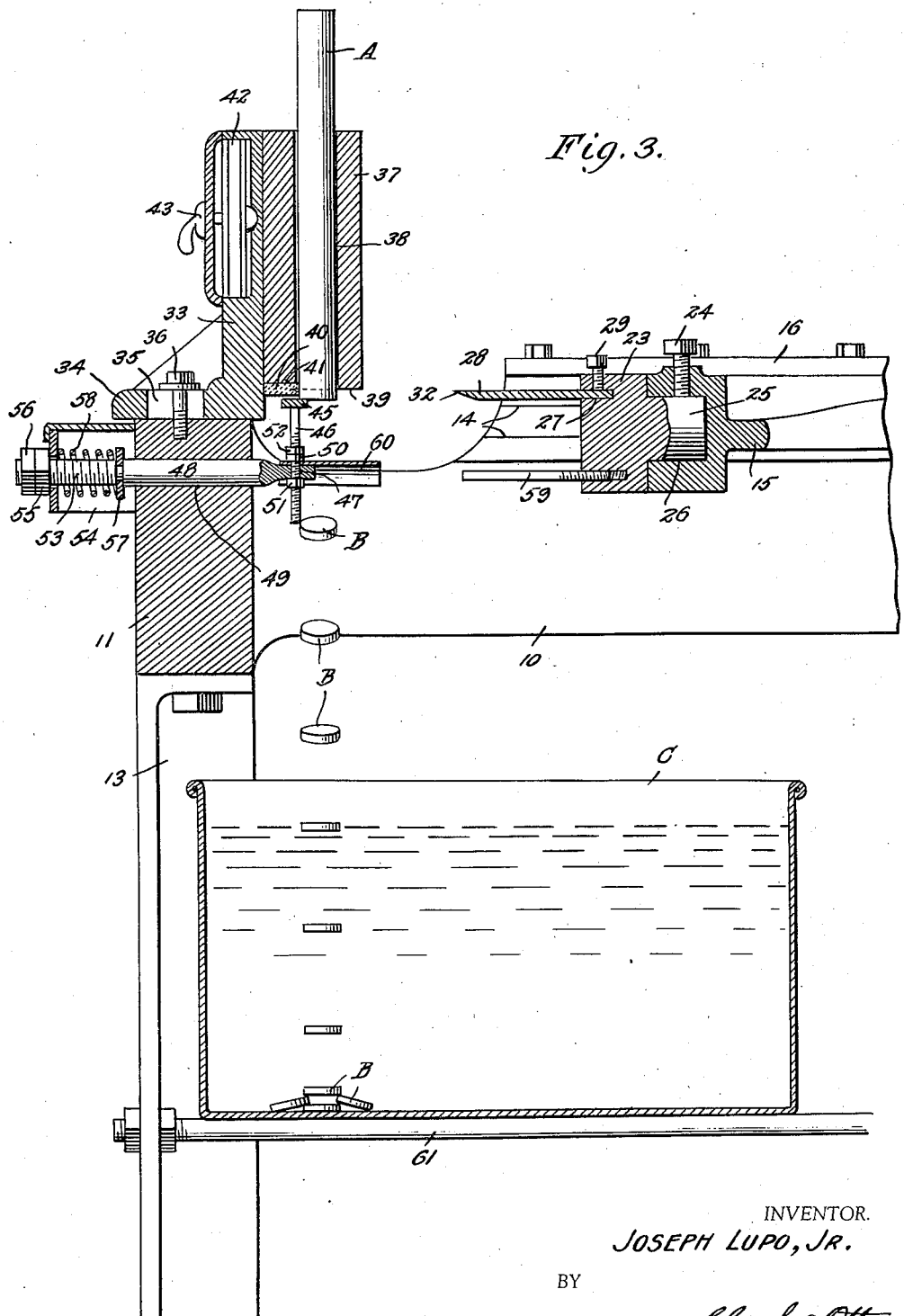
Fig. 3 is a fragmentary sectional view similar to Fig. 2, illustrating the knife in retracted position.

In order to provide means for supporting the stock A with its lower end exposed from the lower end of the stock holder 37 to be sliced upon each forward movement of the knife blade, a horizontally disposed transversely extending stock supporting bar 45 is mounted below the stock holder 37 and traverses the several bores 38 so that the lengths of stock A gravitate through the bores to expose from the lower end of the stock holder the length of stock to be severed in accordance with the thickness of the blanks B to be produced. The bar 45 is vertically adjustable to vary the thickness of the blanks B to be cut and as illustrated, this is accomplished by providing the bar 45 with a pair of transversely spaced depending threaded stems 46 which extend through openings 47 in the rear terminals of the supporting rods 48 which rods extend through openings 49 in the forward end 11 of the bed of the machine. The stems 46 are secured in vertical adjustment by means of nuts 50 and 51 disposed above and below the terminals of the supporting rods 48 with lock nuts 52 engaging the upper nuts 50 to secure the adjustment. The supporting rods 48 are slidably mounted in the openings 49 and are provided with threaded forward ends 53 which extend through openings in a bracket plate 54 spaced forwardly of the front end 11 of the bed, the forward threaded end being provided with an adjustable abutment nut 55 for limiting the rearward movement of the supporting rods 48 and the stock supporting bar 45 with a lock nut 56 which is provided to secure the abutment nut in adjusted position. The rods 48 are each provided with a collar 57 spaced inwardly from the bracket plate 54 to constitute a spring seat between which and the inner face of the bracket plate a coil expansion spring 58 is interposed so that the supporting rods 48 are moved rearwardly by the springs 58, the abutment nut 55 engaging with the bracket plate to dispose the stock supporting bar 45 in the position shown in Fig. 3 where the same underlies the forward portions of the bores 38 with the lower ends of the stock A supported thereby.

For the purpose of moving the stock supporting bar 45 forwardly to a retracted position during the final stage of the slicing action of the knife blade 28 so that the blanks B will fall clear after their severance, the knife holder 23 has projecting forwardly therefrom a pair of push rods 59 which are disposed in axial alignment with the supporting rods 48. The push rods 59 have threaded engagement with the knife holder 23 to permit of axial adjustment thereof, whereby their forward ends are so located as to contact with the supporting rods 48 and effect the retraction of the stock supporting bar 45 slightly in advance of the leading edge of the knife blade, it being understood that the lengths of stock A are supported by the knife blade prior to the retraction of the stock supporting bar 45. By adjusting the push rods 59 forwardly or rearwardly, the timing of the retracted movement of the stock supporting bar 45 may be varied to insure the proper operation of the machine in connection with different types or sizes of stock.

Means is preferably provided for precluding any possibility of the blanks B falling between and being crushed by the push rods 59 and supporting rods 48 which means, as illustrated, consists of semi-circular deflector elements 60 which are secured over the rear terminals of the supporting rods 48 and extend rearwardly therefrom beyond the bores 38.

In practice, the severed blanks drop into a chilling agent, preferably a pan of cold water, so as to prevent distortion thereof and as illustrated, the pan C is supported below the bed of the machine adjacent the forward end thereof on tie rods 61 which extend longitudinally of the machine and are connected to the legs 13.

Where the articles to be produced are sliced from a hollow length of stock D, as illustrated in Fig. 4 wherein there is a possibility of distortion, a member 62 is suspended from any suitable overhead support to lie within the bore of the tubular stock with the lower end of said member disposed slightly above the lower surface 39 of the stock holder 37. This means is resorted to particularly in cutting bracelets having thin walls to insure an initial even cutting of the stock by the knife blade.

While the machine as shown, is described as and preferably is designed to have the knife blade operate in a horizontal plane with the stock fed gravitationally, it is obvious that the invention is not restricted to this arrangement but that it is intended to cover equivalent variations thereof.

The improved method of producing articles from molded plastic materials of the character set forth, consists in molding or otherwise forming the stock into elongated lengths of a cross sectional shape conforming substantially to that of the finished articles to be produced, heating said lengths of stock, preferably by immersing the same in a bath of hot water or by other equivalent means, to soften the same to a degree wherein it may be sliced by a knife without distorting the same, successively slicing from an end of the stock blanks of a thickness approximating the thickness of the finished articles, maintaining said stock at said predetermined degree of softness during the slicing operation, chilling the blanks immediately following the slicing operation, preferably by immersing the same in a bath of cold water and finally finishing and polishing the blanks in a tumbling barrel or by other means.

In order to facilitate the setting of the stock supporting bar 45, a transverse strap 65 is provided which has upturned extremities 66 respectively in flat contact with the outer surfaces of the sides 10 of the bed. The extremities 66 are provided with vertical slots 67 slidable over the shanks of set screws 68 which when tightened function to retain the strap 65 in vertically adjusted position. The strap 65 is provided with upstanding rods 69 in axial alignment with the threaded stems 46 while the extremities 66 are provided with pointers 70 adapted to cooperate with graduations 71 and indicia 72 on gage plates 73 secured to the outer faces of the sides 10 of the bed in juxtaposition to the extremities 66. In setting the stock supporting bar 45, the strap 65 is first adjusted in accordance with the graduations and indicia and the set screws 68 are tightened to maintain the adjustment. The nuts 50 and 51 are loosened on the depending stems 46 of the stock supporting bar 45 and the stems moved into abutting relation with the upstanding rods 69. The nuts 50 and 51 are then tightened to maintain the set position and the lock nuts 52 tightened. The set screws 68 are then loosened and the strap 65 and rods 69 lowered to an out-of-the-way position.

What is claimed is:

1. A slicing machine for successively cutting articles from a length of stock including a holder through which the stock is fed, stock supporting means adjacent one end of the holder against which the stock is fed, a knife movable with reference to the stock to successively sever a predetermined length thereof, and means movable in timed relation with the knife for retracting the first named means to a position out of engagement with the stock during a portion of the cutting stroke of the knife, said last named means being adjustable to vary the timed relation of movement of the stock supporting means with reference to the knife.

2. A slicing machine for successively cutting articles from a length of stock including a holder through which the stock is fed, stock supporting means adjacent one end of the holder against which the stock is fed, a knife movable with reference to the stock to successively sever a predetermined length thereof, means movable in timed relation with the knife for retracting the first named means to a position out of engagement with the stock during a portion of the cutting stroke of the knife, said last named means being adjustable to vary the timed relation of movement of the stock supporting means, and spring means for advancing the first named means to a position underlying the stock on the retraction of the knife, said spring means being adjustable to vary the extent of advancement of the stock supporting means under the stock.

3. A slicing machine for successively cutting articles from a length of molded plastic stock including a holder having a vertical bore corresponding to the cross sectional contour of the stock and through which holder said length of stock is gravitationally fed, means for heating the holder to maintain the stock therein at a predetermined temperature to soften the same for cutting, a retractable element underlying and spaced from the lower end of the holder with which the lower end of the stock is engaged and by which the same is supported to expose a predetermined length thereof, a horizontal reciprocatory knife movable under the lower end of the holder to sever from the remainder of the stock the length thereof exposed from the holder, and a container located in subterposed relation to the holder containing a chilling liquid into which the severed lengths fall immediately following the severing operation.

4. In a slicing machine of the character set forth including a stock holder having a vertical bore through which the stock is gravitationally fed, a retractible stock supporting element underlying and spaced from the lower end of the holder with which the lower end of the stock is engaged and by which the same is supported to expose a predetermined length thereof, a horizontal reciprocatory knife movable under the lower end of the holder to sever from the remainder of the stock the length thereof exposed from the end of the holder, means protruding from the knife support engageable with the stock holder for retracting the same coincident with the cutting of the stock, and a shield carried by the stock supporting element for deflecting and preventing the severed pieces of stock from being caught between said retractible element and the means for retracting the same.

JOSEPH LUPO, JR.